United States Patent [19]

Hartung et al.

[11] 4,154,115

[45] May 15, 1979

[54] METHOD AND DEVICE FOR CONTINUOUS MEASURING OF GAS PRESSURES

[75] Inventors: Claus Hartung; Rainer Jurgeit, both of Berlin, German Democratic Rep.

[73] Assignee: Akademie der Wissenschaften DDR, Berlin, German Democratic Rep.

[21] Appl. No.: 800,129

[22] Filed: May 24, 1977

[30] Foreign Application Priority Data

Jun. 8, 1976 [DD] German Democratic Rep. ... 193241
Jan. 25, 1977 [DD] German Democratic Rep. ... 197067

[51] Int. Cl.$^2$ .............................................. G01L 9/12
[52] U.S. Cl. ........................................ 73/718; 73/724
[58] Field of Search ..................... 73/398 C, 718, 724; 361/283

[56] References Cited

U.S. PATENT DOCUMENTS

| | | | |
|---|---|---|---|
| 3,295,360 | 1/1967 | Dimeff | 73/398 C |
| 3,399,572 | 9/1968 | Riordan et al. | 73/398 C |
| 3,425,281 | 2/1969 | Barz | 73/398 C |
| 3,557,621 | 1/1971 | Ferran | 73/398 C |

Primary Examiner—Anthony V. Ciarlante
Attorney, Agent, or Firm—Nolte & Nolte

[57] ABSTRACT

A method and a device for the continuous measurement of gas pressures are provided. The gas pressure to be measured is modulated in a small partial volume and the pressure fluctuations thus produced are converted into electrical signals which are proportional to the gas pressure to be measured. The apparatus comprises a housing within which a modulation chamber is formed, that chamber communicating with the volume of which the pressure is to be measured through a defined opening or metering orifice. The modulation chamber is bound on one side by a pressure transducer connected to an alternating voltage source and on the other side, by a receiver for converting the pressure fluctuations into an electrical signal. The distance between the pressure transducer and receiver is kept small relative to the sound wave length at the modulation frequency.

24 Claims, 2 Drawing Figures

METHOD AND DEVICE FOR CONTINUOUS MEASURING OF GAS PRESSURES

BACKGROUND OF THE INVENTION

This invention is concerned with a method of and apparatus for measuring gas pressures over a wide range from high vacuums to pressures greater than atmospheric. The primary application of the invention is in the measurement of vacuums.

Known vacuum gauges can be divided into those which measure the pressure directly and those which measure pressure-dependent gas parameters. The advantage of vacuum meters of the first-mentioned type resides in the fact that they are independent of the type of gas if the gas laws for a perfect gas are substantially followed. Among the direct pressure measuring gauges there are those in which a diaphragm or membrane is deformed or deflected by the gas pressure, that deformation or deflection being measured and those wherein the gas pressure pushes a column of liquid upward against the force of gravity, the shift in height of the column being measured.

The Pirani vacuum meter, which utilizes the pressure-dependent heat conductivity of gases for measuring pressure is typical of the second type of gauge as is the Penning vacuum meter of which pressure measurement is based on the pressure-dependency of the current intensity of an automatic gas discharge. Also of the second type of gauge is the friction vacuum meter which utilizes the pressure-dependency of the friction coefficient of the gas and the ionization vacuum meter where the pressure dependency of the ionization degree of the gas caused by electron impact, is used for measuring.

Membrane vacuum meters require a complicated production technology and are, therefore, expensive; further reproduction of the zero point or calibration, is difficult. Box vacuum meters are not suited for exact measurements and liquid vacuum meters entail the shortcoming that vaporization of the measuring liquid occurs in the measuring vessel and the measuring range is very small during a continuous measurement.

Vacuum gauges wherein the pressure dependency of a gas parameter is utilized for measuring the pressure have the disadvantages of being dependent upon the type of gas of which the pressure is to be measured and of the non-linearity of the relationship of the parameter to be measured with the pressure. The Penning vacuum gauge has the additional shortcoming of relatively great measurement inaccuracies; the gas to be measured can disintegrate in the ionization vacuum meter and the Pirani vacuum meter has only a small measuring range.

The present invention seeks to provide a method for continuously measuring gas pressures and apparatus for use in that method which permit direct measuring independently of the type of gas. No liquids are to be used in accordance with the invention and the measuring process should not alter the gas composition. The absolute measuring exactness should be better than 2% where the gas laws for a perfect gas are followed to within 2%. The device should measure linearly so that its calibration can be completely effective at a single pressure point and the same measuring scale be used for all measuring ranges.

SUMMARY OF THE INVENTION

In accordance with the invention the objective is achieved by modulating the gas of which the pressure is to be measured in a small volume and converting the resultant pressure fluctuations into electrical signals which are proportional to the gas pressure. If the gas to be measured can be described in close approximation to the equations of state for a perfect gas, we have:

$$p \cdot V = K \qquad (1)$$

where p is the pressure to be measured, K is a constant and V is the volume to be modulated. If the volume is varied between two extremes $V_1$ and $V_2$, the resultant pressure difference is:

$$\Delta p = p_1 - p_2 = K \left( \frac{1}{V_1} - \frac{1}{V_2} \right) \qquad (2)$$

Substituting in equation (2), the value of K from equation (1):

$$\Delta p = V \left( \frac{1}{V_1} - \frac{1}{V_2} \right) \cdot p \qquad (3)$$

At a constant volume modulation, therefore, the pressure variation is in proportion to the absolute pressure. The proportionality factor stems from the geometrical conditions and contains no gas type related variables.

In order to carry the method into effect, a device is provided which is constructed in the following manner: In a housing which is connectable with the volume of which the gas pressure is to be measured, a modulation chamber is formed which communicates with the volume of which the pressure is to be measured through a defined opening or metering orifice. One side of the modulation chamber is bound by a pressure transducer connected to an AC voltage source, while the other side is bound by a receiver for converting a pressure into an electrical signal. The orifice is selected so that the gas pressure in the modulation chamber cannot adapt, within a modulation period, to the gas pressure of the remaining volume. The opening permits continuous pressure measuring since the pressure in the chamber adapts to the gas pressure to be measured, in a period which is large relative to the modulation period it is well known that in a high density gas where the average spacing or average free path length of the gas particles is greater than a specified wave length, that wave length and greater wave lengths will not be propagated. To enable the pressures of extremely high vacuums to be measured with apparatus according to the present invention, as discussed supra, in accordance with the ideal gas laws, even where the spacing between individual gas particles is greater than the sound wave length at the frequency at which the transducer is oscillated will be problematical, it will be recognized. In order to make these measurements in accordance with the ideal gas laws, the distance between the pressure transducer and the receiver is kept small, relative to the sound wave length at the modulation frequency.

In this manner, the laws for perfect gases are substantially satisfied.

The receiver output of the device is connected to an electronic evaluation device which is constructed in a conventional manner. In a preferred embodiment of the device, the distance between the pressure transducer and the receiver is greatest in the center of the modulation chamber and becomes zero toward the edges of that chamber so that the relationship of the deflection of the pressure transducer to its distance from the receiver is equal at all points. Furthermore, means are provided for compensating the recoil of the pressure transducer. The maximum distance between the pressure transducer and receiver is no greater than about 1.0 mm. Preferably, the pressure transducer comprises a disc-shaped piezo element which is mounted on a metal membrane. The receiver which closes the other side of the modulation chamber opposite the pressure transducer is preferably a capacitor microphone.

In one embodiment of the capacitor microphone, the capacitor plate is fashioned as a metal net. In place of the capacitor microphone, a piezo element can also be used as a receiver for measuring pressures in the atmospheric range.

In a preferred embodiment of the invention, the pressure transducer comprises a disc-shaped piezo element on a metal membrane upon which a layer of synthetic material is applied which is concave towards the interior of the chamber.

Drift of the pressure transducer amplitude can be controlled when metal parts that are mechanically connected with the pressure transducer and vibrate together with that transducer and the membrane of the receiver, form a capacitor.

To compensate for recoil caused by the pressure transducer and acting upon the receiver, several measures are proposed which can be used singly or in combination. A reduction of the recoil can be obtained, for example, through a recoil-insensitive construction of the capacitor microphone that is used as a receiver, whereby all capacitor plates which are active in receiving pressure have an identical structure and consist of the same material. A further measure for mechanical compensation of the recoil of the pressure transducer is achieved by providing a body which vibrates in phase-opposition relative to the pressure transducer, that body being disposed outside of the modulation chamber. The negative feedback or regulation of the in-phase recoil of the body which vibrates in the phase-oppositon to the pressure transducer, can be effected through a signal which is received by a microphone which is recoil-sensitive and is coordinated with that body. This makes the total recoil small, relative to the measuring signal produced by the pressure fluctuations.

For electronic compensation of the recoil signal on the capacitor microphone, a second capacitor microphone which receives only the recoil, is arranged outside the modulation chamber. Additionally to the mechanical transmission of the vibrations of the pressure transducer to the receiver through recoil, a mechanical transmission of the vibrations occurs through elastic deformation of the support means for the pressure transducer and the receiver. In order to supress such vibrations, it is proposed to fashion the metal membrane of the pressure transducer in the shape of a cup and support that transducer on the edge of this cup-shaped membrane. Similarly, the receiver membrane which faces the modulation chamber may be of cup-shaped configuration and also be held or supported at its edge.

The pressure modulation in the modulation chamber is attained through the fact that an alternating voltage is applied to the piezo-electric pressure transducer so that the latter moves at the frequency of the voltage. The pressure fluctuations are translated by the capacitor microphone into an electrical signal which is transmitted to an electronic evaluation device. At a measuring band width of 1 Hz, when a capacitor microphone is used as a receiver and under the prerequisite that vibrations which are directly transmitted by the pressure transducer through the housing, to the receiver can be compensated for or prevented, in a pressure range of more than 6 orders of magnitude, the pressure can be measured linearly and independently of the type of gas with an accuracy which corresponds to the accuracy with which the gas of which the pressure is to be measured follows the equations of state for perfect gases.

Through the selection of the size of the modulation chamber and the sensitivity of the membrane of the capacitor microphone, the range of the device of the invention can be varied within wide boundaries. It is possible to combine a plurality of devices with various usage ranges through an electronic evaluation device, in one instrument so that the measuring range of the instrument can be expanded over all pressure ranges that can be measured by the proposed measuring method.

The device of this invention has considerable advantages over known vacuum measuring instruments. Using only one measuring head, it is possible to perform, with high accuracy, continuous pressure measurements over a measuring range emcompassing several orders of magnitude, said measurements being effected in a linear manner and independently of the type of gas. Such a device permits an operation which does not depend upon position; the device is immediately ready to effect measuring operations and is safe against the break-in of pressure. The device is simple to handle, is lightweight, has small overall dimensions and simple construction, all of which reduce the complexity of the technology necessary to produce the device.

BRIEF DESCRIPTION OF THE FIGURES OF THE DRAWINGS

The invention is illustrated in the accompanying drawing of which.

DESCRIPTION OF THE PREFERRED EMBODIMENTS OF THE INVENTION

Figure 1:
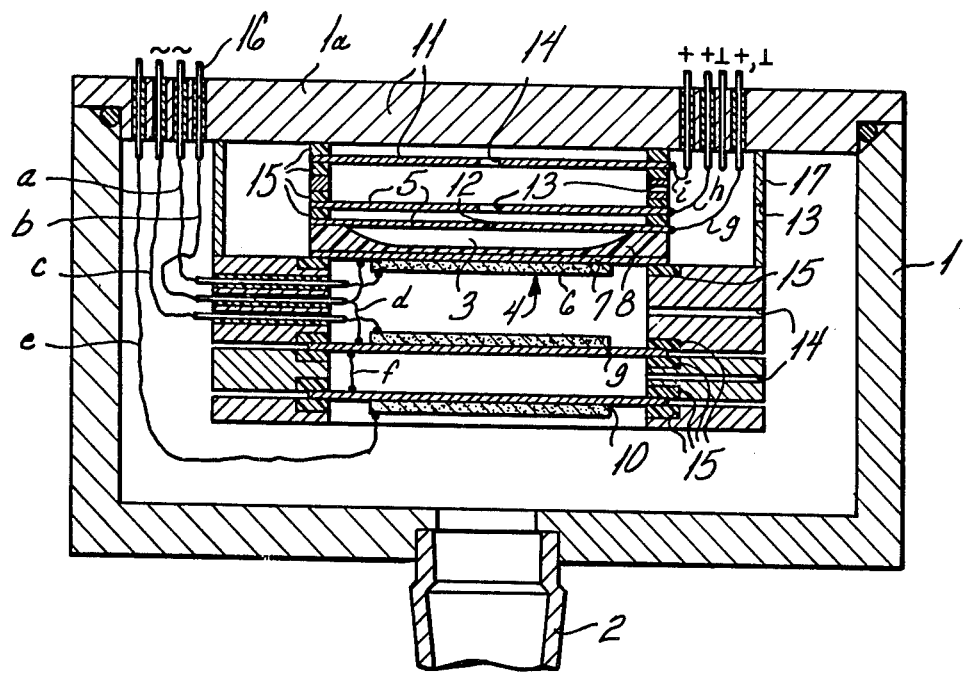
FIG. 1 is an axial section of a gas pressure measuring head of the invention shown schematically and to a large scale.

As shown in FIG. 1, a modulation chamber is defined within a vacuum-tight housing 1 which, by means of a vacuum ground section 2, is connectable with the volume of which the gas pressure is to be measured. The modulation chamber 3 is bound on one side by a pressure transducer 4 and on the other side by a receiver 5 which converts the pressure fluctuations produced by the transducer into an electrical signal. The distance between the pressure transducer 4 and the receiver 5 has its maximum value $a_{max}$ at the center of the chamber and becomes zero towards the edges of that chamber. The distance $a_{max}$ should not exceed 1 mm and in the embodiment illustrated the distance is 0.3 mm.

The pressure transducer 4 consists of a disc-shaped piezo element 6 mounted on a metal membrane 7 to which is applied a layer 8 of a synthetic material, for example, a layer of epoxide resin. The surface of the layer 8 which faces the modulation chamber 3 is concave.

In the embodiment of FIG. 1 of the device, the receiver is a capacitor microphone and the membranes of that microphone are identically constructed of similar material.

For a mechanical compensation of the recoil of the pressure transducer 4, a body or mass 9, in this instance a piezo ceramic, is disposed outside the modulation chamber 3 and is arranged to vibrate in phase opposition relative to the pressure transducer 4. For a countercoupling or regulation of the in-phase recoil of the body 9, the latter can be provided with a recoil-insensitive microphone 10 which, in this case, is also a piezo ceramic. In order to compensate electronically, the recoil signal of the receiver 5, a second capacitor microphone 11 is provided, which is exposed only to the recoil. The housing cover 1a assumes the function of a capacitor plate.

In the membrane of the receiver 5 which defines the modulation chamber 3, there is a metering orifice 12 which, through additional orifices 13 in the device, provides communication between the modulation chamber 3 and the volume of which the gas pressure is to be measured. Other orifices 14 connect that volume with other spaces between the individual elements of the measuring system.

The metal membranes of the elements of the measuring system are insulated from each other and from their receptacles, by insulators 15. The pressure transducer 4 is connected by lead a to a source of alternating current and its metal membrane 7 is connected by lead b with the opposite pole 16 of that source, to produce excitation of the pressure transducer 4 and of the body 9 in phase-opposition. The counter pole 16 is grounded for the control measurement of the pressure transducer amplitude.

Body 9 is connected by a lead c to an alternating current voltage and its metal membrane is connected, through leads d and b to the opposite pole 16 of the alternating current source.

The signal generated by the recoil-insensitive microphone 10 is cnducted from the housing 1 through lead e. The metal membrane of microphone 10 is connected through lead f with the metal membrane of the body 9, while the membrane of receiver 5 which bounds the modulation chamber 3 is connected to ground through lead g.

For the control of the amplitude of the pressure transducer 4, line g is connected to a direct current voltage source with high dynamic internal resistance. The membrane of receive 5 facing away from the modulation chamber 3 is connected via lead h to a direct current voltage source also having a high dynamic internal resistance and also to an electronic evaluation device (not shown and of conventional form) which further processes the measuring signal at lead h. The membrane of the capacitor microphone 11 which serves for the compensation of the recoil, is connected, through lead i, to a direct current voltage source with high dynamic internal resistance. An electrical shield 17 shields the excitation alternating current voltage from the membranes of receiver 5 of the capacitor microphone 11 which compensates the recoil and from leads g, h and i.

Figure 2:
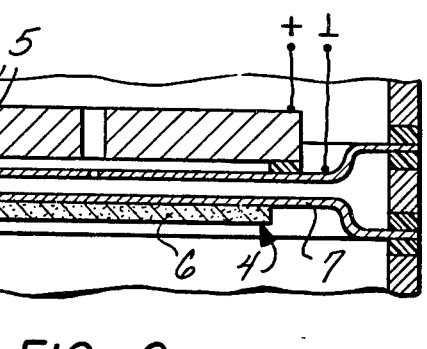
FIG. 2 is an alternative embodiment of the pressure transducer-receiver in the measuring head of FIG. 1.

FIG. 2 shows an alternative configuration of the pressure transducer 4 and of the receiver 5 which is suitable for supressing the mechanical transmission of the vibrations of the pressure transducer 4 to receiver 5 which are cuased by elastic deformation of the holder of the pressure transducer 4 and of the receiver 5. The metal membrane 7 of the pressure transducer 4 is cup-shaped and the pressure transducer is supported at the edge of this cup-shaped membrane 7. Similarly, the membrane of the receiver 5 which bounds chamber 3 is cup-shaped and is also held at its edge.

I claim:

1. Apparatus pressures which comprises a measuring gas pressures housing, modulation chamber within said housing, said chamber being defined in part by a pressure transducer and in part by a receiver, a metering orifice leading to said chamber and means for connecting said chamber, through said orifice, to a volume of which the gas pressure is to be measured, said transducer being connectable to a source of alternating current to produce sound wave modulation of gas pressure in said chamber, said receiver constituting means producing a signal related to the gas pressure in said volume and wherein the maximum distance between said pressure transducer and said receiver is small compared to the sound wave length at the frequency which the gas pressure is modulated, and wherein the distance between said pressure transducer and said receiver has its maximum value in the center of the modulation chamber and becomes zero towards the edges of that chamber whereby the relationship of the deflection of the pressure transducer to its distance from the receiver is equal at all points.

2. Apparatus as claimed in claim 1 wherein the receiver output is connected to an electronic evaluation device.

3. Apparatus as claimed in claim 1 wherein the maximum distance between the pressure transducer and the receiver is not greater than 1.0 mm.

4. Apparatus as claimed in claim 1 wherein the pressure transducer consists of a disc-shaped piezo element mounted upon a metal membrane.

5. Apparatus as claimed in claim 4 wherein a layer of a synthetic material is provided on a side of said membrane facing the modulation chamber, said layer being concave towards the chamber.

6. Apparatus as claimed in claim 1 wherein said receiver comprises a capacitor microphone.

7. Apparatus as claimed in claim 6 wherein a membrane of the microphone which faces away from the modulation chamber is constructed as a metal net.

8. Apparatus as claimed in claim 6 wherein all capacitor plates of said capacitor microphone exposed to the pressure to be measured, are identically constructed and consist of the same material.

9. Apparatus as claimed in claim 6 wherein means are provided for electronically compensating for a recoil signal at the capacitor microphone, said means comprising a second capacitor microphone disposed outside the modulation chamber and receiving only the recoil.

10. Apparatus as claimed in claim 1 wherein the receiver comprises a piezo element.

11. Apparatus as claimed in claim 1 wherein metallic parts which are mechanically connected with the pressure transducer and a membrane of the receiver together form a capacitor.

12. Apparatus for measuring gas pressures which comprises a housing, a modulation chamber within said housing, said chamber being defined in part by a pressure transducer and in part by a receiver, a metering orifice leading to said chamber and means for connecting said chamber, through said orifice, to a volume of which the gas pressure is to be measured, said transducer being connectable to a source of alternating current to produce modulation of gas pressure in said chamber, said receiver constituting means producing a signal related to the gas pressure in said volume and wherein mechanical compensation means compensating for recoil of the pressure transducer are provided, said means comprising a body arranged outside the modulation chamber and means for vibrating said body in phase-opposition to the pressure transducer.

13. Apparatus as claimed in claim 12 wherein means for regulating in-phase recoil of said body are provided, said means comprising a recoil-sensitive microphone.

14. Apparatus for the continuous measurement of gas pressures, comprising:
  a. a housing which is vacuum-tight and has an opening through which the gas whose pressure is to be measured can be admitted to said housing;
  b. bushings for electrical signals and electric voltages in the wall of said housing;
  c. a pressure-tight chamber arranged within said housing which is formed by a movable wall, an opposite second wall and means which provide a defined distance between the two walls;
  d. an electro-mechanical drive means connected with said movable wall to move that wall;
  e. an alternating voltage source connected with said drive means periodically to move said movable wall in order to sound wave modulate the volume of said chamber and hence the gas pressure prevailing in said chamber;
  f. a microphone comprising openings through which the gas of which the pressure to be measured can penetrate into all cavities of said microphone in order to produce an electric signal which is proportional to the pressure fluctuations which occur through said pressure modulation within the pressure-tight chamber;
  g. wherein said second wall of said chamber is identical with said microphone;
  h. an evaluation device whose input is connected with said microphone and whose output is connected with an indicating or control device and which produces a signal at the output dependant on the value of the voltage or the current that is produced by said microphone;
  i. an opening which permits the gas of which the pressure is to be measured to enter into said chamber;
  j. said opening being of a size which allows, for all gases and pressure ranges, the pressure within the environment of the chamber to equalize within a period which, in order to attain independence of the gas type, is greater than the period of the alternating voltage, but which is smaller than one second;
  k. the improvement in which the maximum distance between said movable wall and said microphone is no greater than 1 millimeter and small compared to the sound wave length in all gases to be measured, in order to provide independence of the gas type and an applicability of the measuring principle in the pressure ranges in which the average free path length of the gas particles is greater than the sound wave length.

15. Apparatus according to claim 14 wherein said electro-mechanical drive device in a disc-shaped piezoceramic element secured to a metal diaphragm.

16. Apparatus according to claim 14, wherein said microphone is a capacitor microphone and wherein an electrode of the microphone opposite to a pressure-sensitive deflectable diaphragm of said microphone, is fashioned as a metal net in order to avoid blocking of the gas whose pressure is to be measured, between said deflectable diaphragm and said electrode of the microphone so that the dynamic range is not reduced.

17. Apparatus according to claim 14, wherein said microphone is a piezo-element.

18. Apparatus according to claim 14 wherein said microphone is a capacitor microphone comprising two identical diaphragms one of which forms said second wall of the chamber and the other of which is disposed opposite to and at a defined distance from said one diaphragm in order to obtain an identical reaction of the two diaphragms upon a mechanical impulse transmitted to said microphone, so that during the transmission of a mechanical impulse upon the microphone, the capacity thereof will remain unchanged and said mechanical impulse is not received by said microphone and wherein electrically-insulating means are provided to keep said diaphragms at said defined distance apart.

19. Apparatus according to claim 14, comprising a second microphone which is connected with said first-mentioned microphone outside the indicated chamber and which receives only the mechanical impulse transmitted to the first-mentioned microphone.

20. Apparatus for the continuous measurement of gas pressures, comprising:
  a. a housing which is vacuum-tight and has an opening through which the gas whose pressure is to be measured can be admitted to said housing;
  b. bushings for electrical signals and electric voltages in the wall of said housing;
  c. a pressure-tight chamber arranged within said housing which is formed by a movable wall, an opposite second wall and means which provide a defined distance between the two walls;
  d. an electro-mechanical drive means connected with said movable wall to move that wall;
  e. an alternating voltage source connected with said drive means periodically to move said movable wall in order to sound wave modulate the volume of said chamber and hence the gas pressure prevailing in said chamber;
  f. A microphone comprising openings through which the gas of which the pressure to be measured can penetrate into all cavities of said microphone in order to produce an electrical signal which is proportional to the pressure fluctuations which occur through said pressure modulation within the pressure-tight chamber;
  g. wherein said second wall of said chamber is identical with said microphone;
  h. an evaluation device whose input is connected with said microphone and whose output is connected with an indicating or control device and which produces a signal at the output dependent on the value of the voltage or the current that is produced by said microphone;
  i. an opening which permits the gas of which the pressure is to be measured to enter into said chamber;
  j. said opening being of a size which allows for all gases and pressure ranges, the pressure within the environment of the chamber to equalize within a period which, in order to attain independence of the gas type, is greater than the period of the alternating voltage, but which is smaller than one second;

k. the improvement in which the maximum distance between said movable wall and said microphone is no greater than 1 millimeter and small compared to the sound wave length in all gases to be measured; and l. wherein the distance between said movable wall and said microphone has its maximum value in the center of said chamber and becomes zero towards the edges of the chamber so that the ratio x/y of the deflection x of said movable wall from the rest position to the indicated distance y is the same at all points of said chamber in order to obtain the same pressure modulation throughout said chamber.

21. Apparatus as claimed in claim 20 wherein a layer of synthetic material is applied to that side of said movable wall which faces the interior of said chamber, said layer being so shaped to maintain said ratio.

22. Apparatus according to claim 20, wherein the maximum distance between the movable wall and said microphone is not greater than 1 mm so that the pressure fluctuation over the isothermic gas condition equation corresponds with said volume modulation whereby pressure measurements independent of gas type are obtained.

23. Apparatus according to claim 20, comprising masses which are connected with said microphone outside said chamber via a second drive device and are oppositely accelerated by said second drive device in the direction in which the sum of the mass of the indicated movable wall and the mass of the movable portion of the first-mentioned drive device is accelerated whereby the sum of the impulses which are transmitted by said masses to said microphone, becomes zero.

24. Apparatus for measuring gas pressures which comprises a housing, a modulation chamber within said housing, said chamber being defined in part by a pressure transducer and in part by a receiver, a metering orifice leading to said chamber and means for connecting said chamber, through said orifice, to a volume of which the gas pressure is to be measured, said transducer being connectable to a source of alternating current to produce sound wave modulation of gas pressure in said chamber, said receiver constituting means producing a signal related to the gas pressure in said volume and wherein the maximum distance between said pressure transducer and said receiver is not greater than 1 mm and small compared to the sound wave length at the frequency at which the gas pressure is modulated.

* * * * *

UNITED STATES PATENT AND TRADEMARK OFFICE
CERTIFICATE OF CORRECTION

PATENT NO. : 4,154,115
DATED : May 15, 1979
INVENTOR(S) : CLAUS HARTUNG et al

It is certified that error appears in the above-identified patent and that said Letters Patent are hereby corrected as shown below:

Claim 1, lines 1 and 2 should correctly read:

--Apparatus for measuring gas pressures which comprises a housing, modulation chamber within said--

Claim 15, line 2 "in" should be --is--

Signed and Sealed this

Second Day of October 1979

[SEAL]

Attest:

RUTH C. MASON
Attesting Officer

LUTRELLE F. PARKER
Acting Commissioner of Patents and Trademarks